United States Patent [19]
Yonek et al.

[11] Patent Number: 6,147,155
[45] Date of Patent: *Nov. 14, 2000

[54] AQUEOUS POLYURETHANE DISPERSIONS CONTAINING NON-CYCLIC DIISOCYANATES AND A PROCESS FOR THEIR PREPARATION

[75] Inventors: Kenneth P. Yonek, McMurray; Yuliya Berezkin, Pittsburgh, both of Pa.

[73] Assignee: Bayer Corporation, Pittsburgh, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/328,317

[22] Filed: Jun. 8, 1999

[51] Int. Cl.$^7$ ............................... C08J 3/00; C08K 3/20; C08L 75/00; C08L 51/00; C08L 67/00
[52] U.S. Cl. .................... 524/591; 524/539; 524/839; 524/840; 524/589; 524/590
[58] Field of Search ..................... 524/539, 591, 524/839, 840, 589, 590

[56] References Cited

U.S. PATENT DOCUMENTS

| | | | |
|---|---|---|---|
| 4,066,591 | 1/1978 | Scriven et al. | 260/29.2 TN |
| 4,092,286 | 5/1978 | Noll et al. | 260/29.2 TN |
| 4,108,814 | 8/1978 | Reiff et al. | 260/29.2 TN |
| 4,203,883 | 5/1980 | Hangauer, Jr. | 260/29.2 TN |
| 4,237,264 | 12/1980 | Noll et al. | 528/67 |
| 4,408,008 | 10/1983 | Markusch | 524/591 |
| 4,871,798 | 10/1989 | Dormish et al. | 524/591 |
| 5,763,526 | 6/1998 | Harakawa et al. | 524/590 |
| 5,922,806 | 7/1999 | Blum et al. | 524/591 |

*Primary Examiner*—Patrick D. Niland
*Attorney, Agent, or Firm*—Joseph C. Gil; Thomas W. Roy

[57] ABSTRACT

The present invention relates to a process for preparing aqueous polyurethane dispersions in a multi-step process by forming an NCO prepolymer by a) reacting a cyclic diisocyanate with a compound containing one or two isocyanate-reactive groups and at least one carboxylic acid or carboxylate group at a molar ratio of cyclic diisocyanate to compound containing one isocyanate-reactive group of at least 1:1 or a molar ratio of cyclic diisocyanate to compound containing two isocyanate-reactive groups of at least 1.5:1, b) adding a non-cyclic diisocyanate having 4 to 12 carbon atoms, a high molecular weight polyol having a number average molecular weight of 400 to 6000, optionally an isocyanate-reactive compound containing non-ionic hydrophilic groups and optionally an at least difunctional isocyanate-reactive compound having a number average molecular weight of less than 400 in amounts such that i) the molar ratio of cyclic diisocyanate to non-cyclic diisocyanate is 4:6 to 9:1 and ii) the overall equivalent ratio of isocyanate groups to isocyanate-reactive groups to prepare the NCO prepolymer is 1.1:1 to 2:1, c) dispersing the NCO prepolymer in water, d) neutralizing at least a portion of any carboxylic acid groups either before, during or after step c) and e) optionally adding a polyamine chain extender that contains a maximum of one unblocked primary or secondary amino group to the water either before, during or after the addition of the NCO prepolymer.

The present invention is also directed to the aqueous polyurethane dispersions prepared by this process.

20 Claims, No Drawings

AQUEOUS POLYURETHANE DISPERSIONS CONTAINING NON-CYCLIC DIISOCYANATES AND A PROCESS FOR THEIR PREPARATION

BACKGROUND OF THE INVENTION

1. Field of the Invention

The present invention relates to a process for preparing aqueous polyurethane dispersions from a mixture of cyclic and non-cyclic diisocyanates using a block copolymer process and to the resulting aqueous polyurethane dispersions.

2. Description of the Prior Art

The production of aqueous polyurethane dispersions is known and described in U.S. Pat. Nos. 4,066,591; 4,092,286; 4,108,814; 4,237,264; 4,203,883 and 4,408,008. The aqueous polyurethanes prepared in these patents are predominantly based on cycloaliphatic diisocyanates. While coatings prepared from these aqueous polyurethanes are suitable for many applications, there is a need for products that have greater flexibility, while retaining their high tensile strength.

It would be expected that aqueous polyurethane dispersions based on non-cyclic diisocyanates, such as 1,6-hexamethylene diisocyanate, would provide greater flexibility. However, attempts to prepare aqueous polyurethane dispersions, which contain hydrophilic carboxylate groups, from this diisocyanate using the well known prepolymer process have not been successful. In this process an NCO prepolymer is prepared in the melt or in an organic solvent and is then dispersed in water and chain extended. Attempts to prepare the NCO prepolymer from 1,6-hexamethylene diisocyanate are problematic for one of two reasons: 1) when the prepolymer is dispersed in water, the viscosity of the dispersion rapidly increases forming a thick paste that cannot be chain extended, or 2) during amine chain extension in the aqueous phase, insoluble urea gel particles are formed that preclude the use of the product for commercial applications.

It is an object of the present invention to provide a process for the preparation of aqueous polyurethane dispersions that can be used to prepare coatings having improved flexibility without substantially affecting the other valuable properties of these coatings, such as high tensile strength and good hydrolytic stability. It is an additional object of the present invention to incorporate large quantities of non-cyclic diisocyanates in the aqueous polyurethanes without suffering from the previously discussed problems associated with prior art processes.

These objects may be achieved with the process according to the present invention for preparing aqueous polyurethane dispersions in which a multi-step process is used to prepare the NCO prepolymer. In the first step of the process a cyclic diisocyanate is reacted with a compound containing ionic or potential ionic groups. Thereafter, the non-cyclic diisocyanate and the remaining isocyanate-reactive compounds are added. Further details concerning this process are set forth hereinafter.

U.S. Pat. No. 4,871,798 discloses a process for reducing the amount of ionic groups needed to prepare stable aqueous polyurethane dispersions by initially reacting a compound containing ionic or potential ionic groups with a diisocyanate prior to the addition of the high molecular weight polyol and other optional isocyanate-reactive components used for the preparation of the NCO prepolymer. However, this patent is directed to improving the dispersibility of the polyurethane as opposed to enabling the production of polyurethane dispersions from non-cyclic diisocyanates. In addition, the patent does not describe reacting the cyclic diisocyanate with the compound containing ionic or potential ionic groups before subsequently incorporating the non-cyclic diisocyanate into the polyurethane in order to overcome the previously discussed difficulties.

DETAILED DESCRIPTION OF THE INVENTION

In accordance with the present invention the term "aqueous polyurethane dispersion" refers to aqueous dispersions of polymers containing urethane groups and optionally urea groups.

The aqueous polyurethane dispersions are prepared by a multi-step process in which an NCO prepolymer is initially formed and subsequently chain extended in the aqueous phase optionally in the presence of a polyamine chain extender. In accordance with the present invention the NCO prepolymer is also formed by a multi-step process. In the first stage a cyclic diisocyanate is reacted with an compound containing one or more isocyanate-reactive groups and at least one carboxylic acid or carboxylate groups to form an intermediate product.

The molar ratio of cyclic diisocyanates to compounds containing one isocyanate-reactive group is at least 1:1, preferably 1:1 to 2:1, more preferably 1:1 to 1.5:1 and most preferably 1:1. The molar ratio of cyclic diisocyanates to compounds containing two isocyanate-reactive groups is at least 1:5:1, preferably 1.5:1 to 3:1, more preferably 1.8:1:2.5:1 and most preferably 2:1. These ratios ensure that at least one of the isocyanate-reactive groups of the compounds containing carboxyl groups are reacted with isocyanate groups, preferably most of the isocyanate-reactive groups are reacted with isocyanate groups from the cyclic diisocyanate.

While molar ratios of greater than 1:1 for the monofunctional compounds containing carboxyl groups and 2:1 for the difunctional compounds containing carboxyl may be used, they are not preferred because they reduce the amount of the non-cyclic diisocyanate that can ultimately be incorporated into the NCO prepolymers in accordance with the present invention.

After the preparation of the previously described intermediate product, the remaining components are reacted with the intermediate product to form the NCO prepolymer. These other components include a high molecular weight polyol, a non-cyclic diisocyanate, optionally an isocyanate-reactive compound containing non-ionic hydrophilic groups and optionally a low molecular weight, isocyanate-reactive chain extender. These components are reacted in amounts sufficient to provide a molar ratio of the cyclic diisocyanate to the non-cyclic diisocyanate of 4:6 to 9:1, preferably 5:5 to 8:2 and more preferably 5:5 to 7:3 and an overall equivalent ratio of isocyanate groups to isocyanate-reactive groups of 1.1:1 to 2:1, preferably 1.2:1 to 1.8:1 and more preferably 1.2:1 to 1.5:1.

Suitable cyclic diisocyanates for reacting with the isocyanate-reactive compound containing ionic or potential ionic groups are those which contain either an aromatic or a cycloaliphatic ring and also contain aliphatically and/or cycloaliphatically-bound isocyanate groups.

Examples cyclohexane-1,3- and -1,4-diisocyanate, 1-isocyanato-3- isocyanatomethyl-3,5,5-trimethyl-cyclohexane (isophorone diisocyanate or IPDI), bis-(4-isocyanatocyclohexyl)-methane, 1,3- and 1,4-bis- (isocyanatomethyl)-cyclohexane, 1-isocyanato-2-isocyanatomethyl cyclopentane, bis-(4-isocyanatocyclohexyl)-methane, 2,4'-diisocyanato-dicyclohexyl methane, bis-(4-isocyanato-3-methyl-cyclohexyl)-methane, α,α,α',α'-tetramethyl-1,3- and/or -1,4-xylylene diisocyanate, 1-isocyanato- 1-methyl-4(3)-isocyanatomethyl cyclohexane, 2,4- and/or 2,6-hexahydrotoluylene diisocyanate. Preferred diisocyanates are bis-(4- isocyanatocyclohexyl)-methane and isophorone diisocyanate.

Isocyanate-reactive compounds containing carboxyl groups, i.e., carboxylic acid groups or carboxylate groups, are chemically incorporated into the polyurethane to provide hydrophilicity and enable the polyurethane to be stably dispersed in an aqueous medium. The carboxylate groups are formed by neutralizing the corresponding carboxylic acid groups either prior to, during or after formation of the NCO prepolymer, preferably after formation of the NCO prepolymer.

Suitable compounds for incorporating carboxyl groups are described in U.S. Pat. Nos. 3,479,310, 4,108,814 and 4,408,008, the disclosures of which are herein incorporated by reference. The neutralizing agents for converting the carboxylic acid groups to carboxylate groups are described in the preceding U.S. patents and are also discussed hereinafter. Within the context of this invention, the term "neutralizing agents" is meant to embrace all types of agents which are useful for converting carboxylic acid groups to carboxylate groups.

Preferred carboxylate groups are the hydroxy-carboxylic acids corresponding to the formula:

(HO)$_x$Q(COOH)$_y$ wherein

Q represents a straight or branched, hydrocarbon radical containing 1 to 12 carbon atoms, x is 1 or 2, preferably 2 and y is 1 to 3, preferably 1 or 2 and more preferably 1.

Examples of these hydroxy-carboxylic acids include citric acid, tartaric acid and hydroxypivalic acid.

Especially preferred acids are those of the above-mentioned formula wherein x=2 and y=1. These dihydroxy alkanoic acids are described in U.S. Pat. No. 3,412,054, herein incorporated by reference. Especially preferred dihydroxy alkanoic acids are the α,α-dimethylol alkanoic acids represented by the structural formula

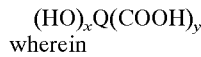

wherein Q' is hydrogen or an alkyl group containing 1 to 8 carbon atoms. The most preferred compound is α,α-dimethylol propionic acid, i.e., wherein Q' is methyl in the above formula.

The carboxylate groups are incorporated in an amount sufficient to provide an ionic group content of at least 10, preferably at least 20 milliequivalents per 100 g of polyurethane. The upper limit for the content of carboxylate groups is 200, preferably 180, more preferably 100 milliequivalents per 100 g of polyurethane.

After reaction of the cyclic diisocyanates with the isocyanate-reactive compounds containing carboxyl groups, the resulting intermediate product is reacted with a non-cyclic diisocyanate and a high molecular weight polyol.

Suitable non-cyclic diisocyanates may be linear or branched and contain 4 to 12 carbon atoms, preferably 4 to 8 carbon atoms and more preferably 6 carbon atoms. Examples of these diisocyanates include 1,4-tetramethylene diisocyanate, 1,6-hexa-methylene diisocyanate, 2,2,4-trimethyl-1,6-hexamethylene diisocyanate and 1,12-dodecamethylene diisocyanate. 1,6-hexamethylene diisocyanate is especially preferred.

Suitable high molecular weight polyols containing at least two hydroxy groups, which may be reacted with the preadducts to prepare the NCO prepolymers, are those having a molecular weight of 400 to about 6,000, preferably 800 to about 3,000 and more preferably 1000 to 2500. The molecular weights are number average molecular weights ($M_n$) and are determined by end group analysis (OH number). Examples of these high molecular weight compounds include polyester polyols, polyether polyols, polyhydroxy polycarbonates, polyhydroxy polyacetals, polyhydroxy polyacrylates, polyhydroxy polyester amides and polyhydroxy polythioethers. The polyester-polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g., by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g., ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethyl-cyclohexane); 2-methyl- 1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylol-propane. The polyesters may also contain a portion of carboxyl end groups. Polyesters of lactones, e.g.,ε-caprolactone or hydroxycarboxylic acids, e.g.,ω-hydroxycaproic acid, may also be used.

Polycarbonates containing hydroxyl groups include those known per se such as the products obtained from the reaction of diols such as propanediol-(1,3), butanediol-(1,4) and/or hexanediol-(1,6), diethylene glycol, triethylene glycol or tetraethylene glycol with phosgene, diaryl-carbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Most preferably, polyethers obtained without the addition of ethylene oxide are used. Suitable starting compounds containing reactive hydrogen atoms include the polyhydric alcohols set forth for preparing the polyester polyols and, in addition, water, methanol, ethanol, 1,2,6-hexane triol, 1,2, 4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Examples of these polyethers as well as suitable polyhydroxy polyacetals, polyhydroxy polyacrylates, polyhydroxy polyester amides, polyhydroxy polyamides and polyhydroxy polythioethers are disclosed in U.S. Pat. No. 4,701,480, herein incorporated by reference.

The high molecular weight polyols are generally present in the polyurethanes in an amount of at least 5%, preferably at least 10% by weight, based on the weight of the polyurethane. The maximum amount of these polyols is generally 85%, preferably 75% by weight, based on the weight of the polyurethane.

Other optional compounds for preparing the NCO prepolymer include low molecular weight, at least difunctional isocyanate-reactive compounds having an average molecular weight of up to 400. Examples include the dihydric and higher functionality alcohols, which have previously been described for the preparation of the polyester polyols and polyether polyols.

In addition to the above-mentioned components which are preferably difunctional in the isocyanate polyaddition reaction, mono-functional and even small portions of trifunctional and higher functional components generally known in polyurethane chemistry, such as trimethylolpropane or 4-isocyanantomethyl-1,8-octamethylene diisocyanate, may be used in special cases in which slight branching of the NCO prepolymer or polyurethane is desired. However, the NCO prepolymers should be substantially linear and this may be achieved by maintaining the average functionality of the prepolymer starting components below about 2.1.

Other optional compounds include isocyanate-reactive compounds containing lateral or terminal, hydrophilic ethylene oxide units. The content of hydrophilic ethylene oxide units may be up to about 10%, preferably up to about 8%, more preferably about 1 to 6% and most preferably about 2 to 6%, by weight, based on the weight of the polyurea. In addition, up to about 75% of the allowable, chemically incorporated, hydrophilic ethylene oxide units may be replaced by the known nonionic, external emulsifiers such as those of the alkaryl type such as polyoxyethylene nonyl phenyl ether or polyoxyethylene octyl phenyl ether; those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

The isocyanate-reactive compounds for incorporating lateral or terminal, hydrophilic ethylene oxide units may contain either one or two isocyanate-reactive groups, preferably hydroxy groups. Examples of these compounds are disclosed in U.S. Pat. Nos. 3,905,929, 3,920,598 and 4,190,566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, such as propylene oxide.

Process conditions for preparing the NCO prepolymers have been discussed in the patents previously incorporated by reference. The finished NCO prepolymer should have a free isocyanate content of about 1 to 20%, preferably about 1 to 10% by weight, based on the weight of prepolymer solids.

Suitable neutralizing for converting the carboxylic acid groups to carboxylate groups either before, during or after their incorporation into the NCO prepolymers, include tertiary amines, alkali metal cations and ammonia. Examples of these neutralizing agents are disclosed in U.S. Pat. Nos. 4,501,852 and 4,701,480, which are incorporated by reference. Preferred neutralizing agents are the trialkyl-substituted tertiary amines, such as triethyl amine, tripropyl amine, dimethylcyclohexyl amine, and dimethylethyl amine.

A sufficient amount of the carboxylic acid groups must be neutralized so that when combined with the optional hydrophilic ethylene oxide units and optional external emulsifiers, the resulting polyurethane will remain stably dispersed in the aqueous medium. Generally, at least about 75%, preferably at least about 90%, of the carboxylic acid groups are neutralized to the corresponding carboxylate groups.

The aqueous polyurethane dispersions of the present invention are formed by dispersing the NCO prepolymer in water and then chain extending the prepolymer. Chain extension can occur by reacting the NCO groups with water or with amine chain extenders in the aqueous phase. Whether linear or cross-linked polyurethane dispersions are obtained generally depends on the functionality of the chain extender.

It has been found in accordance with the present invention that the known polyamine chain extenders containing at least two primary amino groups are not suitable for chain extending the NCO prepolymers. These chain extenders rapidly react with any unreacted, monomeric non-cyclic diisocyanates present in the NCO prepolymers to form insoluble urea gel particles. To overcome this difficulty, it is necessary to use chain extenders that do not contain more than one unblocked primary or secondary amino group.

Preferred chain extenders are the at least partially blocked polyamine chain extenders as disclosed in U.S. Pat. Nos. 4,269,748 and 4,829,122, the disclosures of which are herein incorporated by reference. These patents disclose the preparation of aqueous polyurethane dispersions by mixing NCO prepolymers with at least partially blocked, diamine or hydrazine chain extenders in the absence of water and then adding the mixture to water. Upon contact with water the blocking agent is released and the resulting unblocked polyamine reacts with the NCO prepolymer to form the polyurethane.

Suitable blocked amines and hydrazines include the reaction products of polyamines with ketones and aldehydes to form ketimines and aldimines, and the reaction of hydrazine with ketones and aldehydes to form ketazines, aldazines, ketone hydrazones and aldehyde hydrazones. The at least partially blocked polyamines contain at most one primary or secondary amino group and at least one blocked primary or secondary amino group which releases a free primary or secondary amino group in the presence of water.

Suitable polyamines for preparing the at least partially blocked polyamines have an average functionality, i.e., the number of amine nitrogens per molecule, of 2 to 6, preferably 2 to 4 and more preferably 2 to 3. The desired functionalities can be obtained by using mixtures of polyamines containing primary or secondary amino groups. The polyamines are generally aromatic, aliphatic or alicyclic amines and contain between 1 to 30, preferably 2 to 15 and more preferably 2 to 10 carbon atoms. These polyamines may contain additional substituents provided that they are not as reactive with isocyanate groups as the primary or secondary amines.

Preferred polyamines include 1-amino-3-aminomethyl-3,5,5-trimethylcyclohexane (isophorone diamine or IPDA), bis-(4-amino-cyclohexyl)-methane, bis-(4-amino-3-methylcyclohexyl)-methane, 1,6-diaminohexane, ethylene diamine, diethylene triamine, triethylene tetramine, tetraethylene pentamine and pentaethylene hexamine. Hydrazine is also preferred.

The amount of chain extender to be used in accordance with the present invention is dependent upon the number of terminal isocyanate groups in the prepolymer. Preferably, the ratio of terminal isocyanate groups of the prepolymer to isocyanate-reactive groups of the chain extender is between about 1.0:0.6 and 1.0:1.1, more preferably between about 1.0:0.8 and 1.0:0.98 on an equivalent basis. Any isocyanate groups that are not chain extended with an amine will react with water, which functions as a diamine chain extender.

The final product is a stable, aqueous dispersion of polyurethane particles having a solids content of up to about 60% by weight, preferably about 15–60% by weight and most preferably about 30–45% by weight. However, it is always possible to dilute the dispersions to any minimum solids content desired.

The dispersions may be blended with other dispersions or with other known additives such as fillers, plasticizers, pigments, carbon black, silica sols and the known leveling agents, wetting agents, antifoaming agents and stabilizers. The aqueous polyurethane dispersions are suitable for coating and impregnating woven and non-woven textiles, leather, paper, wood, metals, ceramics, stone, concrete, bitumen, hard fibers, straw, glass, porcelain, plastics of a variety of different types, glass fibers for antistatic and crease-resistant finishing; as binders for non-wovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

Drying of the products obtained by various application techniques may be carried out either at room temperature or at elevated temperature.

In the following examples all parts and percentages are by weight unless otherwise specified.

EXAMPLES

Example 1 - According to the Invention

Stage 1 Preparation of an Adduct From Isophorone Diisocyanate (IPDI) and Dimethylolpropionic Acid (DMPA)

40.14 g (0.36 eq.) of IPDI, 80.85 g of N-methyl pyrrolidone (NMP) and 12.10 g (0.18 eq.) of DMPA were charged into a 500 ml 3-neck round bottom flask equipped with a thermocouple, heating mantle, condenser with drying tube, and stirrer with 2 inch blade. While stirring, the mixture was heated at 90–100° C. until the residual NCO content of the resulting adduct was 5.63% (theoretical NCO=5.67%).

Stage 2 Preparation of an NCO Prepolymer 30.42 g (0.36 eq.) of hexamethylene diisocyanate (HDI) and 186.32 g of a polyester diol (prepared from 1,6-hexane diol, neopentyl glycol and adipic acid, molar ratio of glycols 65:35, $M_n$ 1700) were added to the flask containing the reaction product from stage 1. The components were stirred and heated at 90–100° C to form an NCO prepolymer having a residual NCO content of 3.14% (3.84% theoretical).

The prepolymer was cooled to 60–65° C. and then neutralized by the addition of 9.12 g (0.09 eq.) of triethylamine (TEA). The mixture was stirred for 10 minutes while the temperature was maintained at 60–65° C. The neutralized prepolymer was then mixed with 5.05 g (0.20 eq.) of acetone azine and the mixture was stirred for 15 minutes at 65–70° C.

340 g of the prepolymer was transferred over a 10 minutes period into a 1.5 liter reaction flask containing 330.19 g of demineralized water, which was vigorously agitated by two turbine type stirring blades. The resulting aqueous polyurethane dispersion was heated to 65° C. for 2 hours to complete the reaction between any remaining free isocyanate groups and water. The resulting product was a stable, translucent polyurethane dispersion having a solids content of 40%.

Product data:

Viscosity 150 mPa•s @ 25° C.

pH 7.5

Example 2 - Comparison

Stage 1 Preparation of an Adduct From Hexamethylene Diisocyanate (HDI) and Dimethylolpropionic Acid (DMPA)

28.98 g (0.345 eq.) of HDI, 102.96 g of N-methyl pyrrolidone (NMP) and 9.71 g (0.145 eq.) of DMPA were charged into a 500 ml 3-neck round bottom flask equipped with a thermocouple, heating mantle, condenser with drying tube, and stirrer with 2 inch blade. While stirring, the mixture was heated at 90–100° C. until the residual NCO content of the resulting adduct was 5.87 % (theoretical NCO=5.93 %).

Stage 2 Preparation of an NCO prepolymer 45.26 g (0.345 eq.) of dicyclohexylmethane 4,4'-diisocyanate ($H_{12}$MDI) and 259.25 g (0.305 eq.) of the polyester diol described in Example 1 were added to the flask containing the reaction product from stage 1. The components were stirred and heated at 90–100° C. to form an NCO prepolymer having a residual NCO content of 2.0% (2.26% theoretical).

The prepolymer was cooled to 60–65° C. and then neutralized by the addition of 7.34 (0.07 eq.) of triethylamine (TEA). The mixture was stirred for 10 minutes while the temperature was maintained at 60–65° C. 440 g of the neutralized prepolymer was transferred over a 10 minute period into a 1.5 liter reaction flask containing 420.12 of demineralized water, which was vigorously agitated by two turbine type stirring blades. During the dispersion stage, a rapid increase in viscosity occurred; the prepolymer could not be dispersed in water due the formation of an unprocessable thick paste.

A dispersion was not obtained in this case.

This example demonstrates that the order of addition of the cyclic and non-cyclic isocyanates is important to obtain a stable aqueous polyurethane dispersion. When the order of addition from Example 1 is reversed, it is not even possible to disperse the NCO prepolymer is water.

Example 3 - Comparison

Stage 1 Preparation of an Adduct From Isophorone Diisocyanate (IPDI) and Dimethylolpropionic Acid (DMPA) Adduct 40.14 g (0.36 eq.) of IPDI, 80.85 g of N-methyl pyrrolidone (NMP) and 12.10 g (0.18 eq.) of DMPA were charged into a 500 ml 3-neck round bottom flask equipped with a thermocouple, heating mantle, condenser with drying tube, and stirrer with 2 inch blade. While stirring, the mixture was heated at 90–100° C. until the residual NCO content of the resulting adduct was 5.65% (theoretical NCO=5.68%).

Stage 2 Preparation of an NCO prepolymer 30.34 g (0.36 eq.) of hexamethylene diisocyanate (HDI) and 186.91 g (0.22 eq.) of the polyester diol described in Example 1 were added to the flask containing the reaction product from stage 1. The components were stirred and heated at 90–100° C. to form an NCO prepolymer having a residual NCO content of 4.76% (3.84% theoretical).

The prepolymer was cooled to 60–65° C. and then neutralized by the addition of 9.12 g (0.09 eq.) of triethylamine (TEA). The mixture was stirred for 10 minutes while the temperature was maintained at 60–65° C. 340 g of the neutralized prepolymer were then transferred over a 10 minutes period into a 1.5 liter reaction flask containing 334.42 g of demineralized water, which was vigorously agitated by two turbine type stirring blades. The prepolymer was easily dispersed.

1.84 g (0.0076 eq.) of hydrazine hydrate and 6.84 g (0.2278 eq.) of ethylene diamine were mixed together in 50 g of demineralized water to form a 15% aqueous solution. The solution was then added dropwise to the dispersed prepolymer. The viscosity of the dispersion sharply increased during amine extension. The addition of 100 ml water did not reduce the viscosity.

A gel was formed shortly after the amine extension stage began.

This example demonstrates that even though it was possible to disperse the NCO prepolymer as opposed to comparison example 2, it was not possible to chain extend the dispersed prepolymer with chain extenders containing two unblocked primary amino groups.

Example 4 - According to the Invention

Stage 1 Preparation of an Adduct From Dicyclohexylmethane 4,4'- Diisocyanate ($H_{12}$MDI) and Dimethylolpropionic Acid (DMPA)

47.23 g (0.36 eq.) of $H_{12}$MDI, 83.25 g of N-methyl pyrrolidone (NMP) and 12.15 g (0.18 eq.) of DMPA were charged into a 500 ml 3-neck round bottom flask equipped with a thermocouple, heating mantle, condenser with drying tube, and stirrer with 2 inch blade. While stirring, the mixture was heated at 90–100° C. until the residual NCO content of the resulting adduct was 5.2% (theoretical NCO= 5.3%).

Stage 2 Preparation of an NCO Prepolymer 30.24 g (0.36 eq.) of hexamethylene diisocyanate (HDI) and 187g (0.22 eq.) of the polyester diol described in Example 1 were added to the flask containing the reaction product from stage 1. The components were stirred and heated at 90–100° C. to form an NCO prepolymer having a residual NCO content of 3.00% (3.74% theoretical).

The prepolymer was cooled to 60–65° C. and then neutralized by the addition of 9.11 g (0.09 eq.) of triethylamine (TEA). The mixture was stirred for 10 minutes while the temperature was maintained at 60–65° C. The neutralized prepolymer was then mixed with 4.97 (0.20 eq.) of acetone azine and the mixture was stirred for 15 minutes at 65–70° C.

340 g of the prepolymer was transferred over a 10 minute period into a 1.5 liter reaction flask containing 330.19 g of demineralized water, which was vigorously agitated by two turbine type stirring blades. The prepolymer was easily dispersed in water. The resulting aqueous polyurethane dispersion was heated to 65° C. for 2 hours to complete the reaction between any remaining free isocyanate groups and water. The resulting product was a stable, translucent polyurethane dispersion having a solids content of 40%.

Product data:
Viscosity 85 mPa•s @ 25° C.
pH 7.9

Example 5 - Comparison

Stage 1 Preparation of an NCO Prepolymer by a One Stage Process 45.26 g (0.345 eq.) of dicyclohexylmethane 4,4'-diisocyanate ($H_{12}$MDI), 9.38 g (0.14 eq.) of dimethylolpropionic acid (DMPA), 216.17 g (0.254 eq.) of the polyester diol described in Example 1 and 89.93 g of N-methyl pyrrolidone (NMP) were charged into a 500 ml 3-neck round bottom flask equipped with a thermocouple, heating mantle, condenser with drying tube, and stirrer with 2 inch blade. While stirring, the mixture was heated at 90–100° C. until the residual NCO content of the resulting prepolymer was 2.82% (theoretical NCO=3.19%).

The prepolymer was cooled to 60–65° C. and then neutralized by the addition of 7.08g (0.07 eq.) of triethylamine (TEA). The mixture was stirred for 10 minutes while the temperature was maintained at 60–65° C. The neutralized prepolymer was then transferred over a 10 minutes period into a 1.5 liter reaction flask containing 371.76g of demineralized water, which was vigorously agitated by two turbine type stirring blades.

During the prepolymer dispersion stage, a significant increase in viscosity was observed. An addition of water did not reduce the viscosity. A homogeneous paste was formed.

This example demonstrates that it is not possible to prepare a stable aqueous polyurethane dispersion from a mixture of cyclic and non-cyclic diisocyanates by a process in which all of the reactants are mixed and reacted in one stage.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A multi-step process for preparing an aqueous polyurethane dispersion which comprises forming an NCO prepolymer by
    a) reacting a cyclic diisocyanate with a compound containing one or two isocyanate-reactive groups and at least one carboxylic acid or carboxylate group at a molar ratio of cyclic diisocyanate to compound containing one isocyanate-reactive group of at least 1:1 or a molar ratio of cyclic diisocyanate to compound containing two isocyanate-reactive groups of at least 1.5:1,
    b) adding a non-cyclic diisocyanate having 4 to 12 carbon atoms, a high molecular weight polyol having a number average molecular weight of 400 to 6000, optionally an isocyanate-reactive compound containing non-ionic groups and optionally an at least difunctional isocyanate-reactive compound having a number average molecular weight of less than 400 in amounts such that i) the molar ratio of cyclic diisocyanate to non-cyclic diisocyanate is 4:6 to 9:1 and ii) the overall equivalent ratio of isocyanate groups to isocyanate-reactive groups to prepare the NCO prepolymer is 1.1:1 to 2:1, c) dispersing the NCO prepolymer in water, d) neutralizing at least a portion of any carboxylic acid groups either before, during or after step c) and e) optionally adding a polyamine chain extender that contains a maximum of one unblocked primary or secondary amino group to the water either before, during or after the addition of the NCO prepolymer.

2. The process of claim 1 which comprises reacting a cyclic diisocyanate with a compound containing two isocyanate-reactive groups and one carboxylic acid group.

3. The process of claim 1 wherein said high molecular weight polyol comprises a polyester diol having a number average molecular weight of 1000 to 2500.

4. The process of claim 2 wherein said high molecular weight polyol comprises a polyester diol having a number average molecular weight of 1000 to 2500.

5. The process of claim 1 wherein said non-cyclic diisocyanate comprises 1,6-hexamethylene diisocyanate.

6. The process of claim 2 wherein said non-cyclic diisocyanate comprises 1,6-hexamethylene diisocyanate.

7. The process of claim 3 wherein said non-cyclic diisocyanate comprises 1,6-hexamethylene diisocyanate.

8. The process of claim 4 wherein said non-cyclic diisocyanate comprises 1,6-hexamethylene diisocyanate.

9. The process of claim 1 wherein said polyurethanes contain 10 to 200 milliequivalents per 100 grams of polyurethane of chemically incorporated carboxylate groups wherein at least about 80% of said carboxylate groups are neutralized with tertiary amines.

10. The process of claim 8 wherein said polyurethanes contain 10 to 200 milliequivalents per 100 grams of polyurethane of chemically incorporated carboxylate groups wherein at least about 80% of said carboxylate groups are neutralized with tertiary amines.

11. An aqueous polyurethane dispersion which is prepared by a process which comprises forming an NCO prepolymer by a) reacting a cyclic diisocyanate with a compound containing one or two isocyanate-reactive groups and at least one carboxylic acid or carboxylate group at a molar ratio of cyclic diisocyanate to compound containing one isocyanate-reactive group of at least 1:1 or a molar ratio of cyclic diisocyanate to compound containing two isocyanate-reactive groups of at least 1.5:1, b) adding a non-cyclic diisocyanate having 4 to 12 carbon atoms, a high molecular weight polyol having a number average molecular weight of 400 to 6000, optionally an isocyanate-reactive compound containing non-ionic groups and optionally an at least difunctional isocyanate-reactive compound having a number average molecular weight of less than 400 in amounts such that i) the molar ratio of cyclic diisocyanate to non-cyclic diisocyanate is 4:6 to 9:1 and ii) the overall equivalent ratio of isocyanate groups to isocyanate-reactive groups to prepare the NCO prepolymer is 1.1:1 to 2:1, c) dispersing the NCO prepolymer in water, d) neutralizing at least a portion of any carboxylic acid groups either before, during or after step c) and e) optionally adding a polyamine chain extender that contains a maximum of one unblocked primary or secondary amino group to the water either before, during or after the addition of the NCO prepolymer.

12. The aqueous polyurethane dispersion of claim 11 which comprises reacting a cyclic diisocyanate with a compound containing two isocyanate-reactive groups and one carboxylic acid group.

13. The aqueous polyurethane dispersion of claim 11 wherein said high molecular weight polyol comprises a polyester diol having a number average molecular weight of 1000 to 2500.

14. The aqueous polyurethane dispersion of claim 12 wherein said high molecular weight polyol comprises a polyester diol having a number average molecular weight of 1000 to 2500.

15. The aqueous polyurethane dispersion of claim 11 wherein said non-cyclic diisocyanate comprises 1,6-hexamethylene diisocyanate.

16. The aqueous polyurethane dispersion of claim 12 wherein said non-cyclic diisocyanate comprises 1,6-hexamethylene diisocyanate.

17. The aqueous polyurethane dispersion of claim 13 wherein said non-cyclic diisocyanate comprises 1,6-hexamethylene diisocyanate.

18. The aqueous polyurethane dispersion of claim 14 wherein said non-cyclic diisocyanate comprises 1,6-hexamethylene diisocyanate.

19. The aqueous polyurethane dispersion of claim 11 wherein said polyurethanes contain 10 to 200 milliequivalents per 100 grams of polyurethane of chemically incorporated carboxylate groups wherein at least about 80% of said carboxylate groups are neutralized with tertiary amines.

20. The aqueous polyurethane dispersion of claim 18 wherein said polyurethanes contain 10 to 200 milliequivalents per 100 grams of polyurethane of chemically incorporated carboxylate groups wherein at least about 80% of said carboxylate groups are neutralized with tertiary amines.

* * * * *